W. W. CAMERON.
CONTROLLING MECHANISM.
APPLICATION FILED AUG. 19, 1911.
1,093,827.
Patented Apr. 21, 1914.
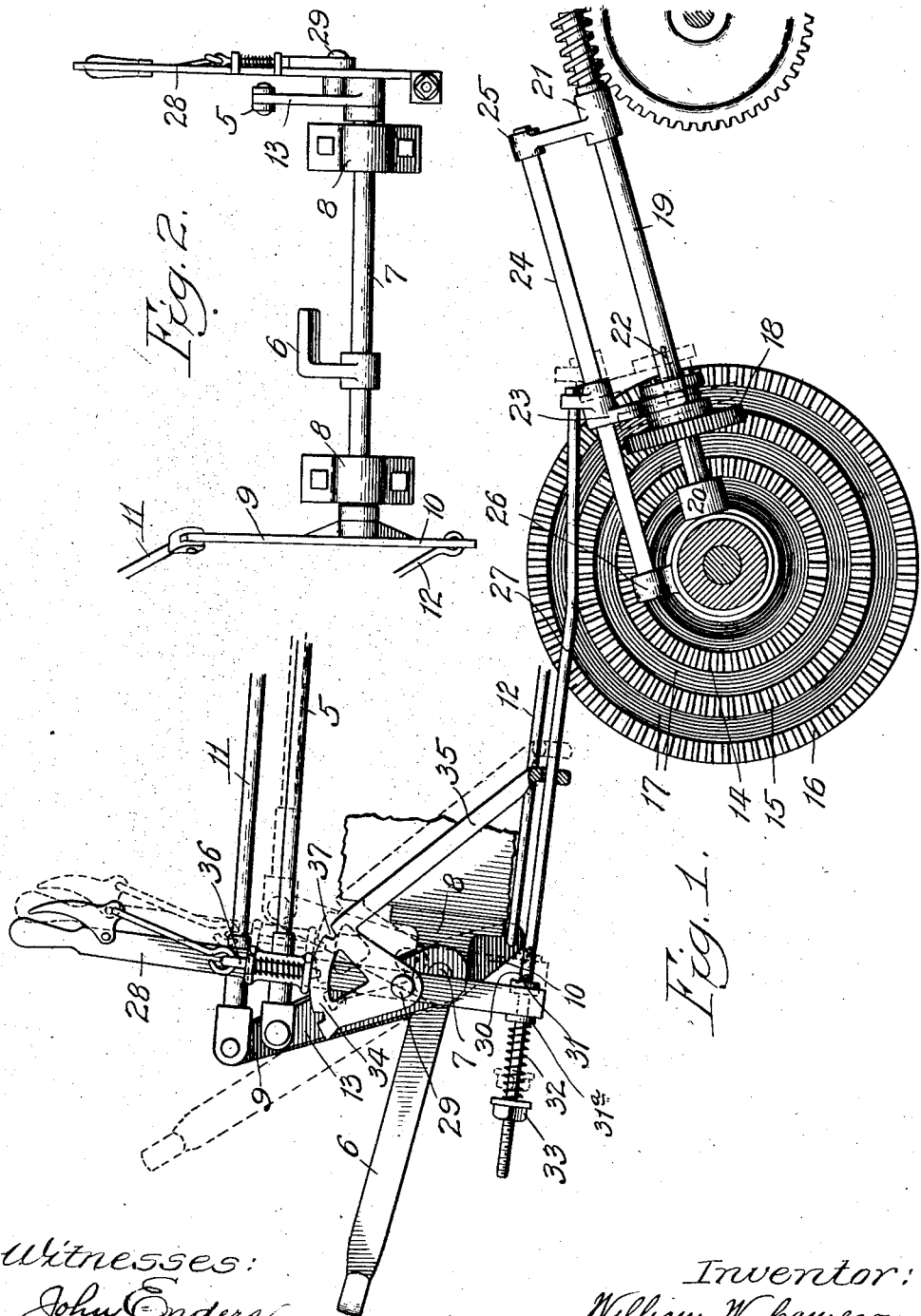

UNITED STATES PATENT OFFICE.

WILLIAM W. CAMERON, OF LA CROSSE, WISCONSIN, ASSIGNOR, BY MESNE ASSIGNMENTS, TO EMERSON-BRANTINGHAM COMPANY, OF ROCKFORD, ILLINOIS, A CORPORATION OF ILLINOIS.

CONTROLLING MECHANISM.

1,093,827.      Specification of Letters Patent.      Patented Apr. 21, 1914.

Application filed August 19, 1911. Serial No. 645,043.

*To all whom it may concern:*

Be it known that I, WILLIAM W. CAMERON, a resident of La Crosse, in the county of La Crosse and State of Wisconsin, have invented certain new and useful Improvements in Controlling Mechanism, of which the following is a full, clear, and exact description.

The invention relates to lever-operated controlling-mechanism, and more particularly of the type in which a primary lever is employed to operate or shift one or more controlling-connections for one or more different devices, for example, in instances where it is desired to render variable-speed gear-mechanism operative or inoperative by means of a primary lever and a connection which includes an adjusting-lever for setting the variable speed-mechanism to drive at different speeds.

The invention designs to provide improved controlling-mechanism which is capable of general application.

The invention consists in the several novel features hereinafter set forth and more particularly defined by claims at the conclusion hereof.

In the drawing: Figure 1 is a side elevation of controlling-mechanism embodying the invention. Fig. 2 is an end elevation.

The improved controlling-mechanism comprises a primary lever 6 which is rigidly secured to a shaft 7, which is mounted in fixed brackets 8, which are sustained in any suitable manner. All of the connections to be operated by the lever 6 are connected to shaft 7, which is pivotally movable in brackets 8 and has arms 9 and 10 secured to one of its ends, and has an arm 13 secured to its other end. Rods 11 and 12 are connected to arms 9 and 10 respectively and are adapted to shift or control devices, which are to be controlled by lever 6. A rod 5 is pivoted to the distal end of arm 13, so that said rod will also be operated or controlled by the lever 6, to control another device. In addition to simultaneously shifting or conjointly controlling devices by rods 11, 12, and 5 by lever 6 the latter is adapted to control a connection which it is desired to occasionally adjust, such as a variable-speed driving-mechanism. In the exemplification shown in the drawing, this mechanism comprises a wheel provided with gears 14, 15, and 16 with spaces 17 therebetween, and a pinion 18 which is adapted to be shifted into or out of operative relation with respect to any of said gears, being slidably mounted on a shaft 19 which is journaled in suitable bearings 20 and 21 and has a keyway 22 in which a key on the pinion slides to cause the pinion to rotate said shaft at different speeds according to the gear with which the pinion meshes. A fork 23 is slidably mounted on a square rod 24 which is secured in bearings 25 and 26 and a rod 27 is adapted to shift said fork, which fits into a groove in the hub of pinion 18, to shift the pinion on its shaft. By shifting rod 27, the pinion may be shifted, into engagement with either of the gears, 14, 15 and 16 to cause the pinion to be driven at different speeds or into the grooves between the gears, or outside of the outer gear 16, to render the pinion inoperative by the driving-wheel. In practice it may be desired to shift the pinion into and out of driving-relation with the gears respectively, simultaneously with the operation of connection-rods 11, 12 and 5, so that the gear-mechanism will always be operated when the primary-lever 6 and said connecting rods are in one of their alternative positions, and so the pinion will be out of driving relation with the gears when the primary-lever and said connections are in the other of their alternate positions.

To permit adjustment of the pinion to vary the speed at which shaft 19 will be driven, an adjusting-lever 28 is included in the connection between rod 27 and the primary shifting element, so that pinion 18 will be shifted relatively to gears 14, 15, and 16, by primary lever 6 in harmony with the other connections and devices controlled by said lever while the speed of the pinion and shaft driven thereby may be varied as desired by the adjusting-lever. Adjusting-lever 28 is pivoted on a stud 29, which is eccentrically disposed with respect to the fulcrum-shaft 7 of the lever 6 and on arm 13, which is rocked by the primary lever. Lever 28 extends below its pivot 29, and is operatively connected to rod 27, and controls the variable-speed driving-mechanism, so as to effect positive shift of rod 27 in that direction which causes the pinion 18 to be thrown out of engagement with the gears and is yieldingly operated in the reverse direction, to facilitate movement of the pinion into engagement with the gears. A pin 30 on rod 27 is engaged by a lug 31 on lever 28, and a spring 32 coiled around said rod and extending between a lug 31ᵃ and a nut 33 on said rod provide such means for operating rod 27 positively in one direction and yieldingly in the other. Rod 27 extends loosely through openings in lugs 31, 31ᵃ on lever 28. Lever 28 is shifted bodily by stud 29 when the primary lever 6 is shifted, and the pivotal movement of lever 28 relatively to eccentric connection 29 and arm 13 is controlled by a rack 34 which is also pivoted on stud 29, and is connected to rod 27 by an arm 35, which is rigid with said rack and through the lower end of which rod 27 is extended. A lever lock 36 is adapted to lock adjusting-lever 28 in different relative positions, with respect to the primary lever 6, the bolt of this lock being adapted to enter either of a series of notches 37 in said rack.

In operation, assuming the mechanism to be in the position illustrated in the drawings, the pinion 18 will be operative by the gear 15. When the main-lever 6 is raised to the position indicated in dotted lines, shaft 7 will be rocked to operate rods 11, 12 and 5 and stud 29 will cause the adjusting-lever 28 and rod 27 to be shifted bodily because the movement of adjusting lever 28 will be controlled by the arm 35 which is connected to the controlling-rod 27. Such operation will cause the connecting rod 27 and the primary lever 6, including lever 28 to be operated to shift pinion 18 out of engagement with gear 15 to the position indicated by dotted lines in Fig. 1. Reverse shift or lowering of the lever 6 will shift all of the connections including rod 27 to cause pinion 18 to be reëngaged with the gear-wheel. When the pinion 18 is to be adjusted to vary the speed of driven shaft 19, adjusting lever 28 will be unlocked from rack 34 and shifted so that the lock 36 will be set into one of the other notches 37 of said rack and resultantly the connection for controlling the variable speed-mechanism will be adjusted to cause pinion 18 to be shifted into and out of engagement with either of the gears 14, 16 and then the pinion will be controlled by primary lever 6, in harmony with the mechanisms controlled by connections 11, 12 and 5. Thus, the variable speed mechanism will be rendered operative and inoperative in synchronism with other devices or mechanism controlled by the primary lever and it is readily adjustable by lever 28, to vary the speed of one of the mechanisms.

The invention thus provides simple controlling mechanism in which there is a primary lever and a connection, which includes an adjusting lever; and in which the adjusting-lever is shifted bodily and its pivotal movement during shift of the lever is controlled by an element of the connection.

The invention is not to be understood as restricted to the details set forth, since these may be modified by the skilled mechanic within the scope of the appended claims, without departing from the spirit and scope of the invention.

Having thus described the invention what I claim as new and desire to secure by Letters Patent is:

1. In controlling-mechanism, the combination of a pivotally movable primary shifting element, an adjusting-lever, an eccentric pivotal connection between said lever and said element, operated by said element to bodily shift the adjusting-lever, a connection operative by said element through said adjusting-lever, locking means for holding the adjusting-lever in different positions relatively to the primary shifting element, and means for controlling the pivotal movement of the locking-means when the eccentric-connection is operated by the primary element.

2. In controlling-mechanism, the combination of a pivotally movable primary shifting element, an adjusting-lever, an eccentric pivotal connection between said lever and said element, operated by said element to bodily shift the adjusting-lever, a connection operative by said element through said adjusting-lever, locking means for holding the adjusting-lever in different positions relatively to the primary shifting element, and means controlled by said connection, for controlling the pivotal movement of the locking-means and lever when the eccentric connection is operated by the primary element.

3. In controlling-mechanism, the combination of a pivotally movable primary shifting element, an adjusting lever, an eccentric pivotal connection between said lever and said element operative by said element to bodily shift the adjusting-lever, a rod connected to and operative by said adjusting lever, lever locking means for holding the adjusting lever in different positions relatively to the primary shifting element, and means connected to said rod, for controlling the pivotal movement of the locking means when the eccentric connection is operated by the primary element.

4. In controlling-mechanism, the combination of a pivotally movable primary shifting element, an adjusting lever, an eccentric pivotal connection between said lever and said element, operative by said element to bodily shift the adjusting lever, a rod operative by and connected to said adjusting lever, locking means for holding the adjusting lever in different positions relatively to the primary shifting element, and means connected to said rod and to said locking-means for controlling the pivotal movement of the lever when the eccentric connection is operated by the primary element.

5. In controlling-mechanism, the combination of a pivotally movable primary shifting element, an adjusting lever, an eccentric pivotal connection between said lever and said element operative by the primary element to bodily shift the adjusting lever, a rod connected to and operative by said adjusting lever, means between said rod and lever for controlling the pivotal movement of the adjusting lever about said eccentric connection to cause it to move relatively to said element when the pivotal connection is operated by the primary element, and an adjustable connection between the lever and said means.

6. In controlling-mechanism, the combination of a pivotally movable primary shifting element, an adjusting-lever, an eccentric pivotal connection between said lever and said element, operated by said element to bodily shift the adjusting-lever, a connection operated by said element through said adjusting lever, a rack, locking-means between the rack and said lever, and means between the rack and the latter connection for controlling the pivotal movement of the adjusting lever about said pivotal connection to cause it to move relatively to said element when the pivotal connection is operated by the primary element.

7. In controlling-mechanism, the combination of a pivotally movable shifting element, an adjusting lever, an eccentric pivotal connection between said lever and said element, operated by said element to bodily shift the adjusting-lever, a connection operated by said element through said adjusting-lever, a rack pivoted on said eccentric connection, locking-means between the rack and lever and means between the rack and the connection operated by the adjusting-lever, for controlling the pivotal movement of the adjusting-lever about said pivotal connection to cause it to move relatively to said element when the pivotal connection is operated by the primary element.

8. In controlling-mechanism, the combination of a pivotally movable primary shifting element, an adjusting-lever, an eccentric pivotal connection between said lever and said element, operated by said element to bodily shift the adjusting-lever, a rod operative by said element through said adjusting-lever, a rack concentrically pivoted with the adjusting lever, locking-means between the lever and the rack for holding the adjusting-lever in different positions relatively to the primary shifting element, and means for controlling the pivotal movement of the rack when the eccentric-connection is operated by the primary element.

9. In controlling-mechanism, the combination of a pivotally movable primary shifting element, an adjusting-lever, an eccentric pivotal connection between said lever and said element, operative by said element to bodily shift the adjusting-lever, a rod operative by said element through said adjusting-lever, a rack concentrically pivoted with the adjusting lever, locking-means between the rack and the lever for holding the adjusting-lever in different positions relatively to the primary shifting element, and an arm on the rack controlled by said rod, for controlling the pivotal movement of the rack and lever when the eccentric connection is operated by the primary element.

10. In controlling-mechanism, the combination of a pivotally movable primary shifting element, an adjusting-lever, a rack, an eccentric pivotal connection between the lever and rack and said element, operative by said element to bodily shift the adjusting-lever and rack, a rod connected to and operative by said adjusting lever, locking-means between the lever and the rack for holding the adjusting lever in different positions relatively to the primary shifting element, and an arm on the rack connected to said rod, for controlling the pivotal movement of the rack when the eccentric-connection is operated by the primary element.

11. In controlling-mechanism, the combination of a pivotally movable primary shifting element, an adjusting-lever, a rack, an eccentric pivotal connection between the lever and said element, operative by said element to bodily shift the adjusting-lever, a rod operative by and connected to said adjusting-lever, a lock between the lever and the rack for holding the adjusting lever in different positions relatively to the primary shifting element, and an arm rigid on the rack connected to said rod for controlling the pivotal movement of the lever when the eccentric connection is operated by the primary element.

12. In controlling-mechanism, the combination of a pivotally movable primary shifting element, an adjusting-lever, a rack, an eccentric pivotal connection between the lever, rack and said element operative by said element to bodily shift the adjusting-lever, and an arm rigid on the rack and through which said rod is extended, to control the pivotal movement of the adjusting-lever about said eccentric connection.

WILLIAM W. CAMERON.

Witnesses:
F. E. DAVIS,
F. TECHMER.